(12) United States Patent
Sobolevskiy et al.

(10) Patent No.: US 8,071,062 B2
(45) Date of Patent: Dec. 6, 2011

(54) HIGH TEMPERATURE CATALYTIC PROCESS TO REDUCE EMISSIONS OF CARBON MONOXIDE

(75) Inventors: Anatoly Sobolevskiy, Orlando, FL (US); Joseph A. Rossin, Columbus, OH (US); Michael J. Knapke, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/640,181

(22) Filed: Dec. 17, 2009

(65) Prior Publication Data

US 2010/0226842 A1 Sep. 9, 2010

Related U.S. Application Data

(60) Provisional application No. 61/158,084, filed on Mar. 6, 2009.

(51) Int. Cl.
*C01B 31/18* (2006.01)
*C01B 31/20* (2006.01)

(52) U.S. Cl. ..................... 423/247; 423/437.2

(58) Field of Classification Search .................. None
See application file for complete search history.

(56) References Cited

U.S. PATENT DOCUMENTS

| | | | | |
|---|---|---|---|---|
| 3,412,013 | A | * | 11/1968 | Bowles .................. 208/120.15 |
| 3,751,906 | A | * | 8/1973 | Leas et al. ...................... 60/772 |
| 4,920,088 | A | * | 4/1990 | Kolts ............................ 502/326 |
| 5,106,799 | A | * | 4/1992 | Green et al. .................... 502/43 |
| 5,355,668 | A | | 10/1994 | Weil et al. |
| 6,239,064 | B1 | * | 5/2001 | Nguyen et al. ................ 502/328 |
| 6,831,036 | B1 | | 12/2004 | Yamazaki et al. |
| 7,390,770 | B2 | | 6/2008 | Nochi et al. |
| 7,470,412 | B2 | * | 12/2008 | Rosen et al. ................... 423/235 |
| 7,655,067 | B2 | * | 2/2010 | Lucas et al. ..................... 75/678 |
| 2008/0199380 | A1 | * | 8/2008 | Echigo et al. ................. 423/247 |

OTHER PUBLICATIONS

C. L. Kiperman, Kinetika & Cataliz, 1994, v. 35, pp. 45-62.

* cited by examiner

*Primary Examiner* — Melvin Mayes
*Assistant Examiner* — Sheng H Davis

(57) ABSTRACT

A method for oxidizing an amount of CO in a CO-containing gas stream, e.g., a combustion stream from fuel combustion, is provided. The method comprises exposing the CO-containing gas stream to a catalytic coating at reaction conditions, including at least 8 vol. % $O_2$ and a temperature of at least 600° C. At these reaction conditions, the method comprises generating gaseous intermediate oxidizing species at the catalytic coating for oxidation of the carbon monoxide within the CO-containing gas stream as a homogeneous reaction to improve CO removal efficiency.

20 Claims, 4 Drawing Sheets

US 8,071,062 B2

HIGH TEMPERATURE CATALYTIC PROCESS TO REDUCE EMISSIONS OF CARBON MONOXIDE

This application claims benefit of the 6 Mar. 2009 filing date of U.S. provisional application No. 61/158,084.

FIELD OF THE INVENTION

The present invention relates to a high temperature catalytic process for reduction of carbon monoxide (CO) in CO-containing gas streams, e.g., combustion exhaust formed during the combustion of fossil fuels in combustion devices. The invention also relates to the field of power generation, and in a particular embodiment, to the control of CO emissions produced during the combustion of fossil fuels, and even more specifically to the catalytic treatment of exhaust gases from a gas turbine power generating station that utilizes lean combustion of the fuel-air mixture (e.g., a fuel mixture with an equivalence ratio of less than 0.8).

BACKGROUND OF THE INVENTION

Carbon Monoxide (CO) is one of major pollutants emitted from combustion sources during the combustion of fossil fuels. A high level of CO in the combustion exhaust is a result of incomplete oxidation of fossil fuels and a relatively low oxidizing rate of CO downstream of the combustor. Due to these factors, the amount of CO being discharged into to the ambient air may be significant. Often, the concentration of CO in the exhaust stream from gas turbines can reach 1,000-1,500 ppm during low load operations. In lean premixed hydrocarbon flames, which are very typical for operation of gas turbines, CO is particularly rapidly formed in the flame zone. The CO is oxidized to $CO_2$ at a rate that is slower than the rate of formation of CO. Numerous catalytic processes have been developed that attempt to decrease emissions of CO from combustion sources, e.g., from gas turbine engines, by improving combustion and/or by utilizing a CO catalyst downstream of the combustion sources, e.g., in a heat recovery steam generator (HRSG) of the combined cycle power plant. Some known systems and processes for reducing CO emissions from combustion sources utilize a catalytic coating that can be coated on the walls of the gas turbine's elements before and after the combustor in order to improve flame stability and completeness of the combustion, thereby providing reduction of CO downstream of the flame.

For example, U.S. Pat. No. 5,355,668 describes a catalytic coating that is applied to at least a portion of the internal surfaces of substantially the whole flow path within a gas turbine to catalyze the combustion of the fuels in order to reduce emissions of CO at least by 15% at an equivalence (fuel to air) ratio of at least 0.8 (rich combustion). This small increase in CO reduction efficiency is achieved primarily due to the enhanced flame stabilization (as a result of the catalyst) and does not significantly reduce CO emissions to the environment, especially for gas turbines operating at low loads where CO concentration in the exhaust is generally very high. As is evident from U.S. Pat. No. 5,355,668, a reduction in the equivalence ratio below 0.8 substantially decreases the efficiency of the catalytic coating, resulting in a reduction of CO efficiency less than 15%. Currently, however, typical gas turbines require the utilization of lean combustion with fuel to air equivalence ratio below 0.6. As such, the proposed solution of U.S. Pat. No. 5,355,668 is impractical for use with such exhaust gases from lean combustion. Operation of the process of U.S. Pat. No. 5,355,668 with exhaust gases from lean combustion, e.g., less than 0.8, results in increased CO emissions, which are ultimately released to the environment.

Other processes for reducing CO emissions employ a catalytic process that reduces CO emissions by direct oxidation of CO to $CO_2$. The reaction between CO and $O_2$ is very slow, and the presence of catalytic materials significantly improves the rate of this reaction. As a general rule, known CO oxidizing catalysts are used at the temperatures below 800° C. (preferably below 600° C.) due to the fact that the desorption rate of oxygen from the catalytic surfaces is substantially increased with temperature, thereby reducing the availability of oxygen species at the catalyst surface for the reaction of the oxygen with CO. In U.S. Pat. No. 6,831,036, for example, the usage of the catalyst with the high oxygen storage capacity enables CO emissions to be reduced at temperatures up to 800° C. only. Other catalytic systems are oriented to react with CO at the surface of the catalyst to produce $CO_2$. Unfortunately, the conversion of CO to $CO_2$ at the catalyst surface occurs at a relatively slow rate and is commonly insufficient to manage CO emissions at low load operations, e.g., combustion with a fuel mixture having a fuel equivalence ratio of 0.8 or less.

BRIEF DESCRIPTION OF THE DRAWINGS

The invention is explained in the following description in view of the drawings that show.

DETAILED DESCRIPTION OF THE INVENTION

The present invention is directed to processes and systems for reducing CO emissions immediately following fuel combustion. In the process, a CO-containing gas stream is flowed into and through a reaction chamber (which may be, for example, the transition piece) of the gas turbine engine following combustion of a fuel. An internal surface of the reaction chamber is coated with a catalytic coating. Critically, when the temperature is at least 600° C. and the oxygen concentration is at least 8vol. %, the process is believed to: (a) form intermediate active oxidizing species at the surface of the catalyst; (b) volatilize the intermediate active oxidizing species on the catalytic surface such that the intermediate oxidizing species travel from the surface of the catalyst into the flow of the CO-containing gas passing through the reaction chamber; and (c) react the intermediate active oxidizing species with CO in the volume of the flow to produce $CO_2$. It is believed that because the oxidizing species and CO are both in a gaseous phase, the conversion of CO to CO2 is a homogeneous reaction (meaning reactants are in the same phase) that proceeds much more quickly than a heterogeneous (different phase) reaction where gaseous CO reacts with a solid phase reactant on the surface of the solid catalyst. These heterogeneous reactions are typical of the prior art processes. Further, because of the increased reaction rate, the processes and systems of this invention advantageously have an efficiency of 80% or higher in removing CO from a gas stream even following the combustion of a fuel having a fuel to air ratio of 0.8 or less (which typically generates more CO). One feature of the present invention is the displacement of the $CO_2$ conversion reaction into the flow volume and away from the site at which the catalyst is used to generate the oxidizing species.

Figure 1:
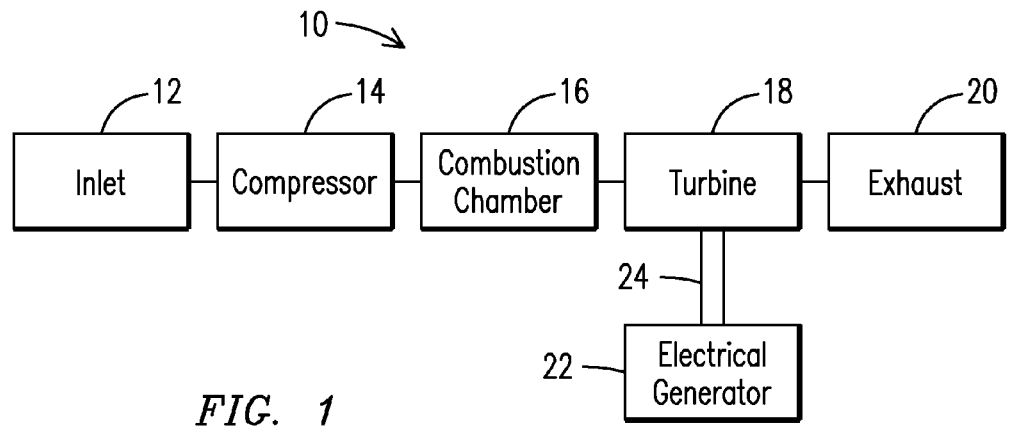
FIG. 1 is a schematic of a conventional combustion system known in the art.
Figure 2:
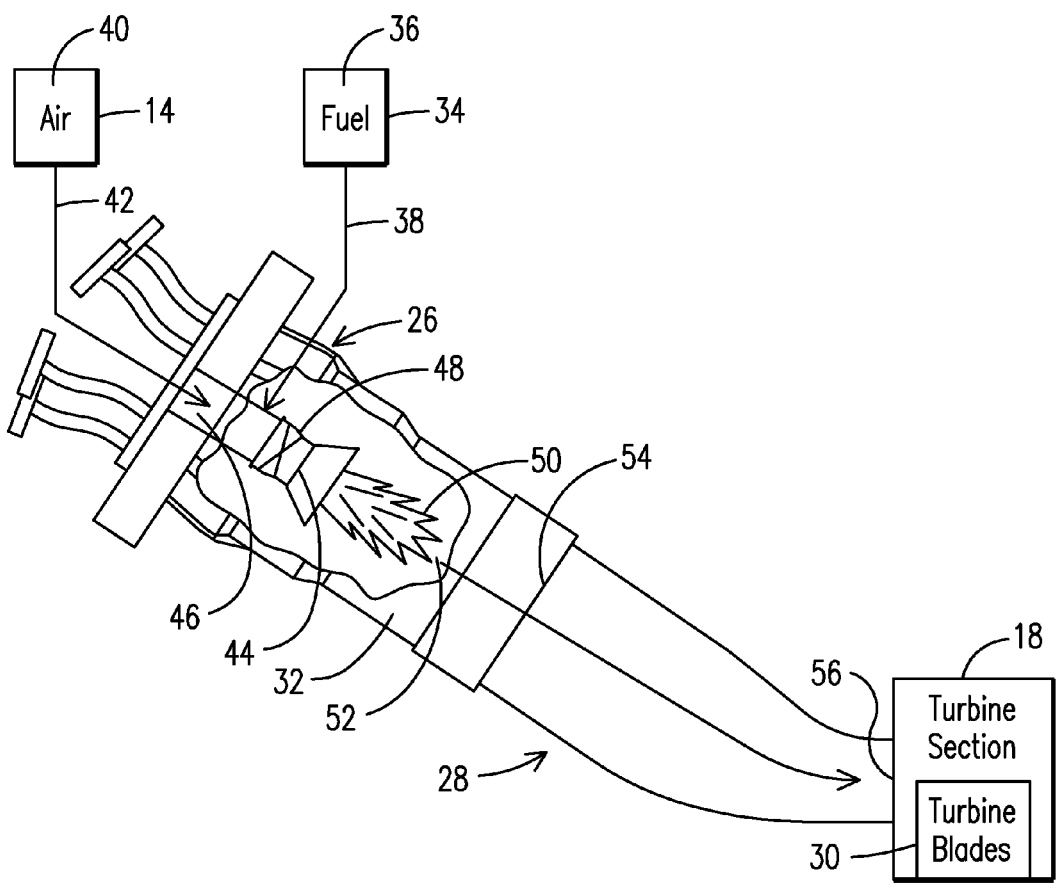
FIG. 2 is a cross-sectional view of a combustion chamber and transition piece in accordance with one aspect of the present invention.

Now referring to the figures, FIG. 1 depicts a typical industrial gas turbine engine 10 comprising in axial flow series: an inlet 12, a compressor section 14, a combustion chamber 16, a turbine section 18, and an exhaust 20. The turbine section 18 is arranged to drive the compressor section 14 via one or more shafts (not shown). Typically, the turbine section 18 is configured to drive an electrical generator 22 via a shaft 24. The combustion section 16 typically includes a circular array of a plurality of circumferentially spaced combustors, e.g., exemplary combustor 26 shown in FIG. 2. A fuel or fuel mixture is burned in each combustor 26 to produce a hot energetic flow of gas, typically containing an amount of CO, which after combustion, flows through a transition piece 28 for flowing the gas to turbine blades 30 of the turbine section 18.

Referring again to FIG. 2, the exemplary combustor 26 of the combustion section 16 is shown as comprising a combustion chamber 32 and the transition piece 28 leading to the turbine blades 30 of the turbine section 18. With typical combustion chambers, the transition piece 28 generally flows hot, post-combustion gases to the turbine nozzles or vanes, and to the first row of turbine blades 30. Typically also, the combustion chamber 32 includes a fuel source 34 that provides fuel 36 to the combustion chamber 32 via a fuel line 38 and at least one air supply, e.g., compressor section 14, which provides a compressed air stream comprising air 40 traveling through a line 42 to the combustion chamber 32. In one embodiment, the fuel 36 and the air 40 may be fed to a mixer for mixing the fuel 36 and the air 40 provided by the fuel line 38 and the line 42. The mixer mixes the fuel 36 and the air 40 so as to provide a fuel-air mixture 44 that travels through a passageway 46. In one embodiment, the mixer comprises a swirling vane 48 that mixes and provides the fuel-air mixture 44 with an annular momentum as it travels through the passageway 46.

In one embodiment, the fuel-air mixture 44 comprises fuel 36 and air 40 at an equivalence ratio of 0.8 or less. Downstream from the swirling vane 48, the fuel/air mixture 44 is ignited with the aid of a pilot flame 50, and optionally any secondary igniters, to produce a combustion stream 52. At least a portion of the resulting combustion stream 52 travels substantially along a central axis of the combustor 28 to an inlet 54 of the transition piece 28, and thereafter to an outlet 56 of the transition piece 28. It is generally known that when the combustion stream 52 is produced from a fuel-air mixture 44 having an equivalence ratio less than 0.8, the amount of CO is increased in the combination stream 52. The combustion stream 52 is expanded in turbine section 18 and directed to exhaust 20. Generally, it is desirable to remove/reduce a portion of the CO prior to emitting any of the gases from combustion stream 52 into the environment from the exhaust 20 (shown in FIG. 1).

In accordance with one aspect of the present invention, following combustion in the combustion chamber 32, the combustion stream 52 is directed to a reaction chamber 58 downstream of the combustion chamber 32 to oxidize an amount of CO in the combustion stream 52 and thereby reduce an amount of CO therein. As used herein, the "reaction chamber" may be any partially or wholly confined area having a cavity that the CO-containing gas stream can pass through. In one embodiment, existing components of the gas turbine engine 10 are utilized as the reaction chamber 58 such that an existing gas turbine engine 10 can be modified without necessarily providing additional components (although some modifications may be necessary as explained below). In a particular embodiment shown in FIG. 3, the reaction chamber 58 is the transition piece 28, which may be modified as necessary to provide the components and conditions (temperature, $O_2$, the introduction of additives, etc.) necessary to carry out the processes for oxidizing CO to $CO_2$ as described herein. Retrofitting or utilizing existing components of the gas turbine engine, e.g., the transition piece 28, effectively reduces costs in using the present invention, as well as eliminates the pressure drop problems if the reaction chamber 58 were provided as a stand-alone module added in-line to an existing gas turbine engine 10 to receive the combustion stream.

Figure 3:
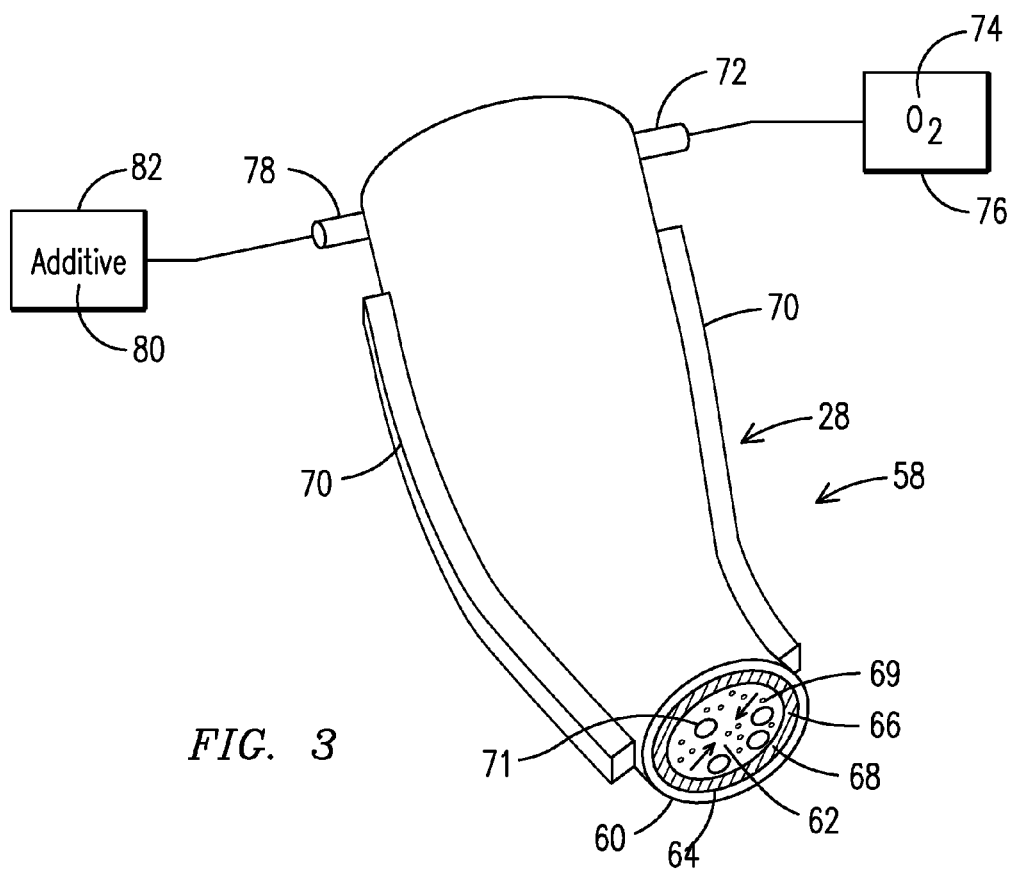
FIG. 3 is a perspective view of a transition piece (defining a reaction chamber) in accordance with an aspect of the present invention.

As shown in FIG. 3, when the transition piece 28 is utilized as the reaction chamber 58, the transition piece 28 comprises a peripheral wall 60 defining a cavity 62. The peripheral wall 60 comprises an inner surface 64, which is coated with a catalytic coating 66. The catalytic coating 66 comprises at least an oxidizing species-producing catalyst 68 (hereinafter oxidizing catalyst 68). The transition piece 28 is particularly advantageous for use as the reaction chamber 58 because the CO-containing gases (e.g., combustion stream 52) traveling downstream from the combustion of the fuel-air mixture 44 into the transition piece 28 are at a temperature or near a temperature desirable for carrying out the reactions for oxidizing an amount of CO in the combustion stream 52 as described herein, e.g., at least 600° C.

The present inventors have found that the operation of the oxidizing catalyst 68 at temperatures of from 600-1200° C. in the presence of at least 8% oxygen provides a substantial increase in CO removal efficiency. Upon contacting a CO-containing gas with the oxidizing catalyst 68 under these conditions, it is believed that the oxidizing catalyst 68 is exposed to heat sufficient to generate active gaseous intermediate oxidizing species 69 on the surface of the catalyst coating 66, which are then desorbed by the flow of the combustion stream 52. In this way, a homogeneous reaction between the gaseous intermediate oxidizing species 69 and the CO molecules 71 in the combustion stream 52 occurs with both entities being in the gaseous phase. While not wishing to be found by theory or limiting in any way, the following reaction schemes set forth in a published article by Kiperman C. L., in Kinetica and Catalysis, 1994, v. 35, pp. 45-62, represent possible reactions at heterogeneous and homogeneous stages.

Heterogeneous Stage:

$$A+Z \rightarrow A^*Z$$

$$O_2+2Z \rightarrow 2O^*Z$$

$$A^*Z+O^*Z \rightarrow AO^*Z+Z$$

$$AO^*Z+O_2 \rightarrow AO_2+O^*Z$$

Homogeneous Stage:

$$A^*Z + O_2 \rightarrow AO^*Z + O^*$$

$$O^* + A \rightarrow AO^*$$

$$AO^* + O^* \rightarrow AO_2$$

where: A=oxidized molecules (e.g., CO)
A*Z, AO*Z, O*Z=active complexes on the surface of the catalyst Z The oxidizing catalyst 68 may be one or more suitable catalysts for facilitating the oxidation of CO to $CO_2$, while preferably, at the same time, yielding the gaseous intermediate oxidizing species 69 for the CO oxidation reactions. Due to the high temperatures within the reaction chamber 58 and of the CO-containing gas stream (e.g., combustion stream 52), the oxidizing catalyst 68 preferably possesses excellent thermal stability in order to increase the durability of the oxidizing catalyst 68. Exemplary oxidizing catalysts include, but are not limited to, one or more of the transition metals of groups 6B, 8B and 9, and in one embodiment, include copper, platinum, palladium, chrome, iron, nickel, rhodium, gold, silver, ruthenium and mixtures thereof. In addition, any known form of catalyst structure may be utilized. In one embodiment, the oxidizing catalyst 68 is coated on the inner surface 64 of the peripheral walls 60 of the reaction chamber 58.

The oxidizing catalyst 68 may be deposited on a suitable catalyst support as is known in the art. The catalyst support may be one or more of alumina, silica, zirconias, e.g., zirconium dioxide ($ZrO_2$), zirconium phosphate, cerium oxide ($CeO_2$), and mixtures thereof. Other additives, such as sulfate, lanthanum, barium, zirconium, may also be present with the oxidizing catalyst 68 for stabilizing the oxidizing catalyst 68 or for other effects. An exemplary procedure for preparation of an oxidizing catalyst 68 for use in the present invention is provided in Example 1 below. While not wishing to be bound by theory, it is believed that the temperatures and oxygen content within the reaction chamber 58 promote the production of active intermediate oxidative species on the surface of the catalytic coating 66. These gaseous intermediate oxidizing species 69 will volatilize at the temperatures within the reaction chamber 58 and move into the flow of the CO-containing gas stream to react with CO to produce $CO_2$. In one embodiment, the catalytic coating 66 comprises a platinum group metal, a zirconia support, and up to 10% by weight lanthanum.

Figure 4:
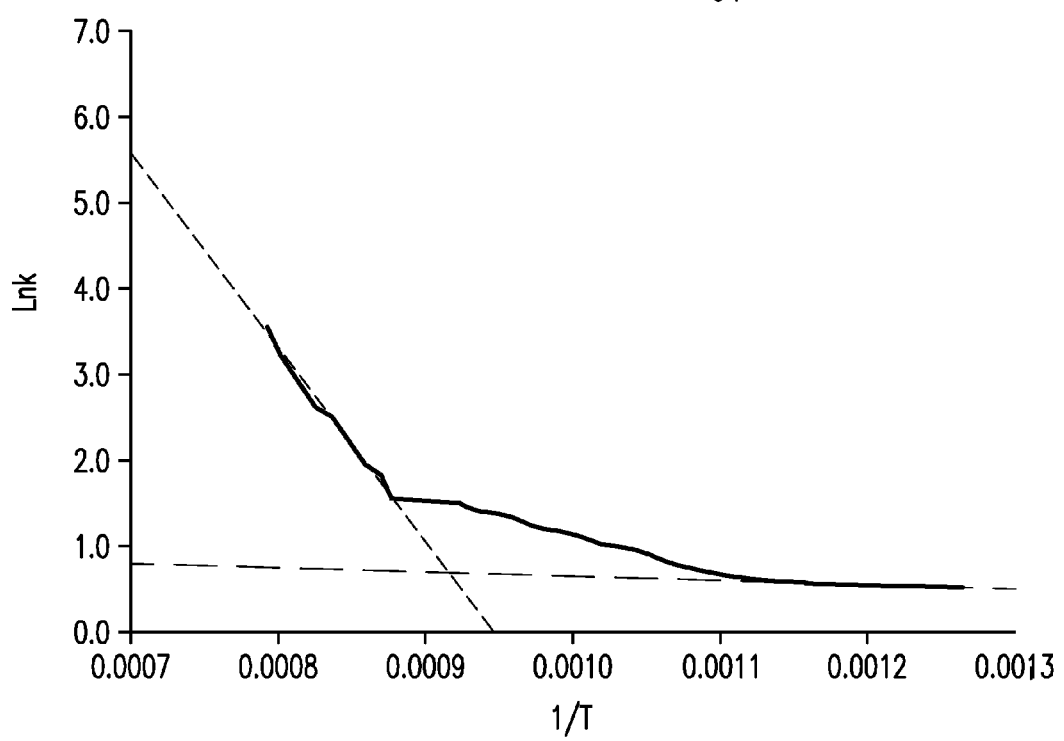
FIG. 4 is a graph showing the temperature dependence of the rate of the reactions for $CO_2$ based on Arrhenius' equation.

The temperature dependence of the rate of the reactions for $CO_2$ formation using an embodiment of a process described herein was evaluated by using Arrhenius' Equation: $\ln(k) = E/RT + \ln K_0$. As shown in FIG. 4, it is readily apparent that there is a change in activation energy in the region of temperatures between 600 and 800° C. At the region of the plot to the left from values of 1/T=0.0009, a high E value (approximately 40,000 cal/mole) represents the very temperature sensitive reaction that converts CO to $CO_2$. The magnitude of the activation energy (approximately 40,000 cal/mole) is quite typical for gas phase reactions that proceed significantly only at high temperatures. Low activation energy values at 1/T values below 0.0012 represent a region where reactions may occur at the surface of the catalytic coating 66, and thus are considered heterogeneous reactions. When, for example, the temperature of the CO-containing gas stream is brought to a temperature greater than 800° C., the conversion rate of CO to $CO_2$ may be greater than 90%. The transition in the reaction region from one of a heterogeneous surface reaction to one of a homogeneous reaction in the gas phase indicates that the active intermediate oxidizing species 69 are formed on the surface of the catalyst 68 and are emitted into the flow of the CO-containing stream, e.g., combustion stream 52, where the active intermediate oxidizing species 69 can react with CO to form $CO_2$.

To maintain the environment within the reaction chamber 58 and/or within the combustion stream at the desired temperature, a heating element, e.g., an electrical heater 70, may be provided about the perimeter of an outer surface of the peripheral walls 60 of the reaction chamber as shown in FIG. 3. The heating element may be any suitable heating element known in the art for producing heat. In one embodiment, the desired temperature within the reaction chamber 58 is at least 600° C., and in one embodiment is from 600-1200° C., and in another embodiment from 800-1000° C. In this way, the temperature of the combustion stream 58 flowing through the reaction chamber 58 can be heated to the desired temperature for CO conversion, especially as a homogeneous reaction.

To provide an oxygen concentration within the cavity 62 of the reaction chamber 58 that is at least 8 vol. %, the reaction chamber 58 may also comprise an oxygen inlet 72 for introducing a quantity of oxygen 74 into the reaction chamber 58 from a suitable oxygen source 76. In one embodiment, the oxygen concentration is the reaction chamber 58 is maintained between 8 vol. % and 18 vol. %. The oxygen 74 in the reaction chamber 58 is believed to aid in the generation of the gaseous intermediate oxidizing species 69 on a surface of the catalytic coating 66. In one embodiment, the CO-containing gas is the combustion stream 52 and the combustion stream itself already includes the required oxygen concentration for the conversion of CO to $CO_2$. In another embodiment, all or part of the oxygen required within the reaction chamber 58 is provided via the inlet 72 into the reaction chamber 58.

In accordance with another aspect of the present invention, the CO oxidization efficiency of the reaction chamber 58 can be further enhanced via the introduction of a fuel additive. As shown in FIG. 3, the reaction chamber 58 may also comprise a fuel additive inlet 78 for introducing a quantity of a fuel additive 80 into the reaction chamber 58 from a suitable fuel additive source 82. The fuel additive 80 is a chemical entity suitable that is able to produce a quantity of further oxygen active species (such as OH*, $HO_2$*, and the like) on the surface of the oxidizing catalyst 68. These oxygen active species are able to move volume of the flow of the CO-containing gas stream, e.g., combustion stream 52, and increase the overall CO conversion rate. Exemplary fuel additives 80 may include, but not limited to, are $H_2$, $CH_4$, $C_2H_6$, etc and their homologues, etc. Example 3 below compares the CO conversion rate with and without addition of $CH_4$ as the fuel additive 80 into the reaction chamber 58. As set forth in Example 3, the addition of the fuel additive 80 can substantially improve CO conversion efficiency and, consequently, further reduce emissions of CO into the ambient air. The amount of the fuel additive 80 added to the reaction chamber 58 may vary depending on the concentration of CO provided in the CO-containing gas stream. In one embodiment, from 25-100 ppm of the fuel additive 80 is added for every 1000 ppm of CO in the CO-containing gas stream. In a particular embodiment, the fuel additive 80 is methane and 50 ppm of methane is provided for every 1000 ppm of CO in the CO-containing gas stream.

Figure 5:
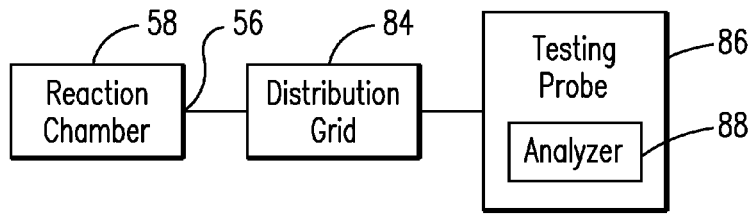
FIG. 5 is a schematic showing the transition piece of FIG. 3 in-line with a distribution grid and an analyzer in accordance with an aspect of the present invention.

In another embodiment, as shown in FIG. 5, the reaction chamber 58 may further include components to measure the amount of CO remaining in the CO-containing gas stream after passing the CO-containing gaseous through the reaction chamber 58. In one embodiment, as shown, a distribution grid 84 may be provided downstream of the outlet 56 of the reaction chamber 58 (e.g., transition piece 28), for diverting a quantity of the CO-containing gas probe to a testing probe 86. The sample taken by the testing probe 86 may be provided to an analyzer 88 configured to measure the amount of CO in the CO-containing gas stream by known methods.

In an alternate embodiment, the area in and about the first row of turbine blades 30 may define the reaction chamber 58, e.g., the enclosed area where the reaction takes place. The blades and/or area about the blades may be coated with the catalytic coating 66 in amount sufficient to reduce an amount of CO in the combustion stream 52. The blades and/or area about the blades 30 may be modified as described above with respect to the transition piece 28.

Figure 6:
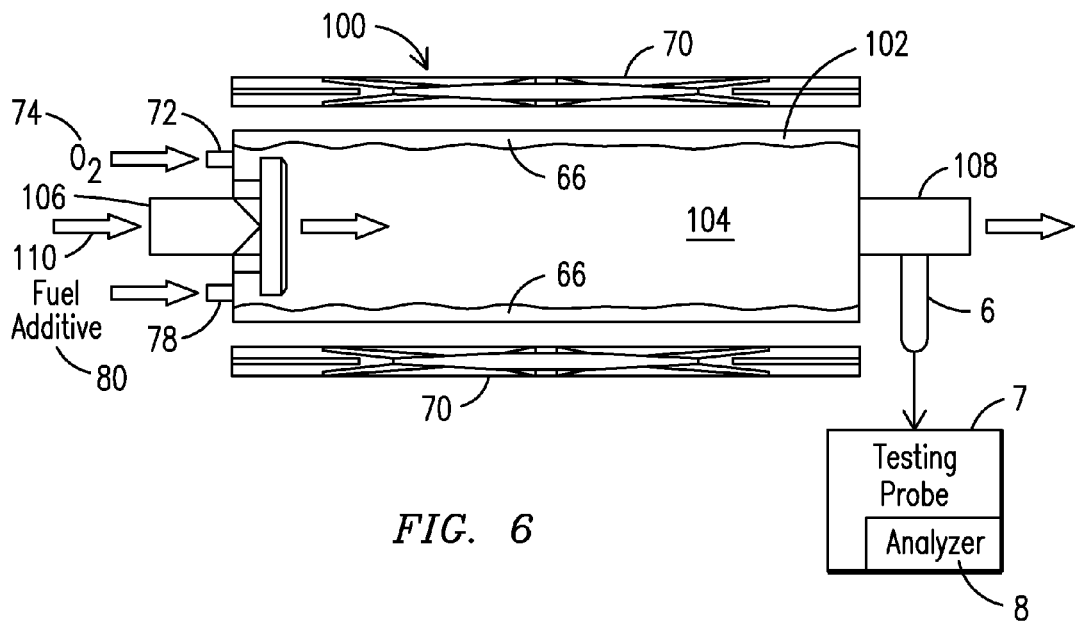
FIG. 6 is a cross-sectional view of a reaction chamber in accordance with another aspect of the present invention.

It is understood that the above description of the gas turbine 10 is merely exemplary and that any other suitable gas turbine configuration providing a source of CO-containing exhaust gas may be utilized with the present invention. It is further understood the processes and systems disclosed herein may be utilized to reduce CO emissions from a CO-containing gas stream regardless of the source of the CO-containing gas stream, e.g., from sources other than from fossil fuel combustion. Thus, in another embodiment, the reaction chamber 58 is provided as a stand-alone module 100 as shown in FIG. 6, which may be placed in-line in any suitable system or may be configured to receive a feed of an CO-containing gas stream from any suitable source. The module 100 may comprise all the elements described herein for the reaction chamber 58. In the embodiment shown, the module 100 comprises a peripheral wall 102 defining a cavity 104, and an inlet 106 and an outlet 108. An inner surface of the peripheral wall 102 may be coated with the catalytic coating 66 as described above. The catalytic coating 66 comprises at least the oxidizing catalyst 68. When in operation, a CO-containing gas stream 110 may be flowed into the inlet 106, through the cavity 104, and out the outlet 108 of the module 100.

The module 100 may also be equipped with a heating element, e.g., the electrical heater 70, about a perimeter of an outer surface of the peripheral wall 102 of the module 100 to maintain a temperature within the reaction chamber of at least 600° C., and in one embodiment from 600-1200° C., and in another embodiment, from 800-1000° C. Further, as explained above, the module 100 may also be equipped with the oxygen inlet 72 for introducing a quantity of oxygen 74 into the module to bring the vol. % of oxygen within the module 100 to at least about 8 vol. %, and in a particular embodiment, from 8-18 vol. %. Further, to enhance the conversion of CO to $CO_2$, a fuel additive inlet 78 may be provided for introducing the fuel additive 80 into the module as described above. As shown in FIG. 5, a distribution grid 84 may be provided downstream of the outlet 56 of the reaction chamber 58 (e.g., module 100), for diverting a quantity of the CO-containing gas stream to a testing probe 86. The sample taken by the testing probe 86 may be provided to the analyzer 88 configured to measure the amount of CO in the CO-containing gas stream.

Figure 7:
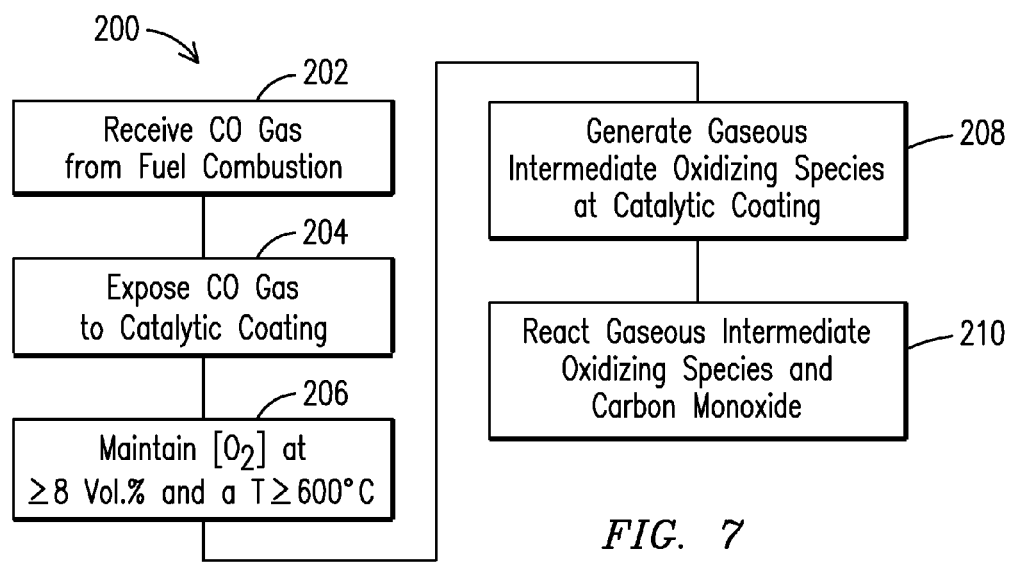
FIG. 7 is a schematic of a method for oxidizing carbon monoxide in a carbon monoxide-containing gas stream in accordance with the present invention.

Referring to FIG. 7, there is shown and described a method 200 for oxidizing an amount of CO in a CO-containing gas stream, e.g. combustion stream 52. The method 200 comprises step 202 of receiving the carbon monoxide (CO)-containing gas stream from fuel combustion comprising an amount of carbon monoxide into an inlet 54 of a reaction chamber 58 downstream from the fuel combustion. The method further comprises step 204 of exposing the CO-containing gas stream to a catalytic coating 66 disposed on an internal surface 64 of the reaction chamber 58 and step 206 of maintaining an oxygen concentration of at least 8 vol. % and a temperature of at least 600° C. within the reaction chamber 58. To oxidize the carbon monoxide in the CO-containing gas stream, the method 200 further comprises step 208 of generating gaseous intermediate oxidizing species 69 at the catalytic coating 66 and step 210 of reacting at least a portion of the gaseous intermediate oxidizing species 69 and carbon monoxide in a flow of the CO-containing gas stream as a homogeneous reaction to produce carbon dioxide within the reaction chamber 58. In one embodiment, the CO-containing gas stream is from the combustion of a fuel having an equivalence ratio of 0.8 or less and the process achieves a CO removal efficiency from the CO-containing gas stream of at least 80%.

Figure 8:
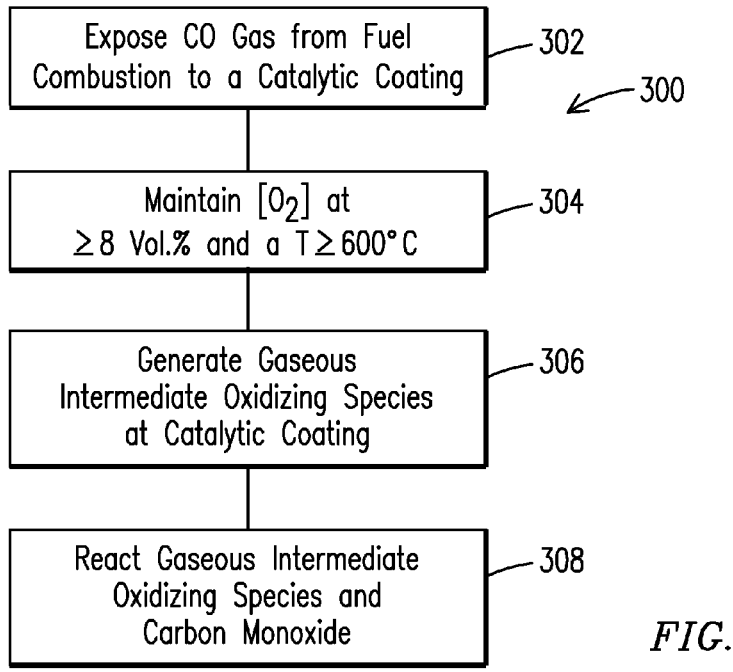
FIG. 8 is a schematic of another method for oxidizing carbon monoxide in a carbon monoxide-containing gas stream in accordance with the present invention.

Referring to FIG. 8, there shown another embodiment of a method 300 for oxidizing an amount of CO in a CO-containing gas stream. The method 300 comprises step 302 of exposing a carbon monoxide (CO)-containing gas stream from fuel combustion, the CO-containing gas stream comprising an amount of carbon monoxide to a catalytic coating 66 disposed on a surface, e.g., 64, downstream from the fuel combustion and step 304 of maintaining an oxygen concentration of at least 8 vol. % and a temperature of at least 600° C. within the CO-containing gas stream. Further, the method comprises step 306 of generating gaseous intermediate oxidizing species 69 at the catalytic coating 66 for oxidation of carbon monoxide within the CO-containing gas stream and step 308 of reacting the intermediate gaseous oxidizing species and the carbon monoxide in a flow of the CO-containing gas stream to produce carbon dioxide.

Figure 9:
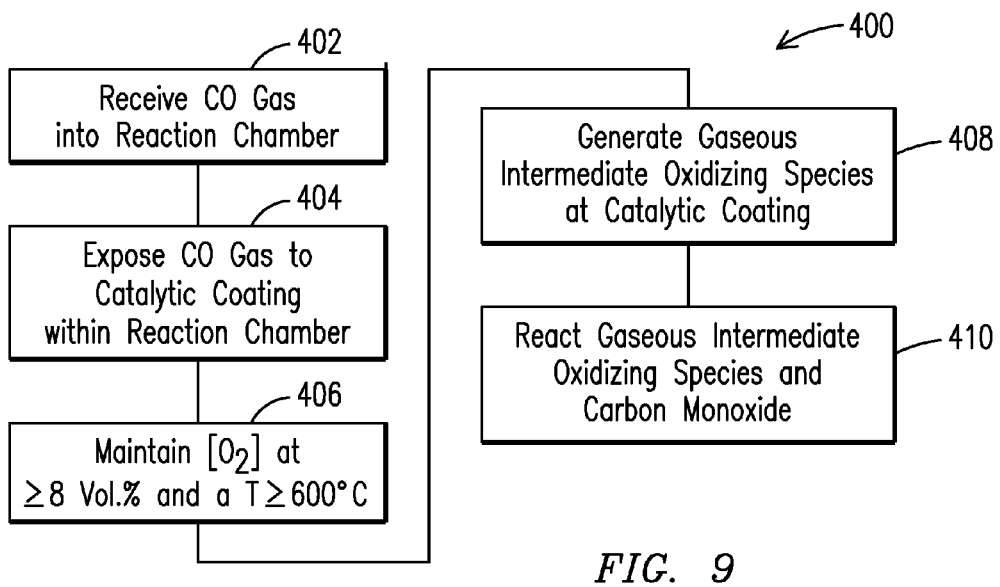
FIG. 9 is a schematic of yet another method for oxidizing carbon monoxide in a carbon monoxide-containing gas stream in accordance with the present invention.

Referring to FIG. 9, there is shown yet another embodiment of a method 400 for oxidizing an amount of CO in a CO-containing gas stream, e.g. combustion stream 52. The method 400 comprises step 402 of receiving the carbon monoxide (CO)-containing gas stream comprising an amount of carbon monoxide into an inlet 54 of a reaction chamber 58. The method further comprises step 404 of exposing the CO-containing gas stream to a catalytic coating 66 disposed on an internal surface 64 of the reaction chamber 58 and step 406 of maintaining an oxygen concentration of at least 8 vol. % and a temperature of at least 600° C. within the reaction chamber 58. To oxidize the carbon monoxide in the CO-containing gas stream, the method 400 further comprises step 408 of generating gaseous intermediate oxidizing species 69 at the catalytic coating 66 and step 410 of reacting at least a portion of the gaseous intermediate oxidizing species and carbon monoxide in a flow of the CO-containing gas stream as a homogeneous reaction to produce carbon dioxide within the reaction chamber 58. In one embodiment, the reaction chamber 58 is a stand-alone module.

The below examples are provided to illustrate certain aspects of the present invention and are not intended to be limiting in any respect.

EXAMPLE 1

Catalyst Preparation 9.57 g $La(NO_3)_3$ (37.6% $La_2O_3$) was added to a beaker and dissolved with 80 mL DI water. This solution was added to 150 g of $Zr(OH)_4$ in a beaker and blended for one hour. The resulting material was emptied into a pan and placed in an oven to dry at 90° C. Product was then calcined at 550° C. for one hour (two hour ramp to 550° C. at 4.6°/min), then heated to 1100° C. with the final temperature maintained for two hours (two hour ramp from 550° C. to 1,100° C. at 10°/min. Following calcination, the $La_2O_3$—$ZrO_2$ was crushed and sieved<60 mesh.

A washcoat was prepared by adding 89 g of the $La_2O_3$—$ZrO_2$ material, 89 g of zirconium acetate solution (20% $ZrO_2$ and 200 mL of deionized (DI) water) to a beaker. The catalyst substrate was coated onto the inside diameter of a stainless steel tube which had an ID of 1.652 in. Following coating, the tube was dried in an oven at 110° C. Once dried, this procedure was repeated twice. Thereafter, the tube was calcined at 700° C. for two hours. A loading of 6 g/L washcoat was achieved.

A platinum metal solution was prepared by adding to a beaker, 0.301 g platinum chloride (55.4% Pt), 0.5 g g TEA (triethanolamine), and diluted to 25 g with DI water. The platinum solution was added via a pipette to the inside of the tube yielding a loading of 1.26 g Pt per foot cube. The tube was dried in an oven at 110° C. and calcined in the reactor at 1000° C. prior to testing.

EXAMPLE 2

This example illustrates achievements of using the process of high temperature catalytic CO reduction. Initial concentration of CO is 1000 ppm with concentration of oxygen in the simulated exhaust 10 vol. %. The GHSV through the tube is 5,000.

TABLE 1

| CO conversion efficiency | |
|---|---|
| Temperature, ° C. | CO Conversion, % |
| 520 | 41 |
| 615 | 46 |
| 680 | 61 |
| 800 | 76 |
| 870 | 79 |
| 950 | 87 |
| 990 | 89 |

EXAMPLE 3

This example illustrates the improvement in the CO conversion rate when methane is added to the reaction chamber with concentration of 50 ppm. The initial concentration of CO is 1000 ppm with concentration of oxygen in the simulated exhaust 10 vol. %.

TABLE 2

| CO Conversion Efficiency with Addition of $CH_4$ | | |
|---|---|---|
| | CO Conversion, % | |
| Temperature, ° C. | No Addition of $CH_4$ | With Addition of $CH_4$ |
| 870 | 79 | 84 |
| 990 | 89 | 97 |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for oxidizing carbon monoxide in a carbon monoxide-containing gas stream comprising:
receiving a carbon monoxide (CO)-containing gas stream from fuel combustion comprising an amount of carbon monoxide into an inlet of a reaction chamber downstream of the fuel combustion;
exposing the CO-containing gas stream to a catalytic coating disposed on an internal surface of the reaction chamber;
maintaining an oxygen concentration of at least 8 vol. % and a temperature of at least 600° C. within the reaction chamber;
generating gaseous intermediate oxidizing species at the catalytic coating for oxidation of the carbon monoxide within the reaction chamber; and
reacting at least a portion of the gaseous intermediate oxidizing species and carbon monoxide in a flow of the CO-containing gas stream as a homogeneous reaction to produce carbon dioxide within the reaction chamber.

2. The process of claim 1, wherein the CO-containing gas stream is from the fuel combustion of a fuel source having an equivalence ratio of 0.8 or less, and wherein the process achieves a CO removal efficiency from the CO-containing gas stream of at least 80%.

3. The process of claim 1, wherein the reaction chamber is a transition piece in a gas turbine engine.

4. The process of claim 1, wherein the temperature within the reaction chamber is at least 800° C., and wherein the oxygen concentration is from 8 to 18 vol. %.

5. The process of claim 4, wherein the temperature within the reaction chamber is between 800° C. and 1000° C.

6. The process of claim 1, further comprising introducing gaseous fuel additives into a flow of the carbon monoxide gas stream within the reaction chamber to increase a conversion rate of the carbon monoxide.

7. The process of claim 6, wherein the gaseous fuel additives comprise one or more additives from the group consisting of hydrogen, methane, homologues of methane, or mixtures thereof.

8. The process of claim 6, wherein the gaseous fuel additives comprise methane.

9. The process of claim 1, wherein the catalytic coating comprises a platinum group metal, a zirconia support, and up to 10% by weight lanthanum.

10. A process for oxidizing carbon monoxide in a carbon monoxide-containing gas stream comprising:
exposing a carbon monoxide (CO)-containing gas stream from fuel combustion comprising an amount of carbon monoxide to a catalytic coating disposed on a surface downstream from the fuel combustion;
maintaining an oxygen concentration of at least 8 vol. % and a temperature of at least 600° C. within the CO-containing gas stream;
generating gaseous intermediate oxidizing species at the catalytic coating for oxidation of carbon monoxide within the CO-containing gas stream; and
reacting the gaseous intermediate oxidizing species and the carbon monoxide in a flow of the CO-containing gas stream to produce carbon dioxide.

11. The process of claim 10, wherein the CO-containing gas stream is from fuel combustion of a fuel source having an equivalence ratio of 0.8 or less, and wherein the process achieves a CO removal efficiency from the CO-containing gas stream of at least 80%.

12. The process of claim 10, wherein the temperature within the CO-containing gas stream is at least 800° C., and wherein the oxygen concentration is from 8 to 18 vol. %.

13. The process of claim 12, wherein the temperature within the CO-containing gas stream is between 800° C. and 1000° C.

14. The process of claim 10, further comprising introducing gaseous fuel additives into a flow of the CO-containing gas stream.

15. The process of claim 14, wherein the gaseous fuel additives comprise one or more additives from the group consisting of hydrogen, methane, homologues of methane, or mixtures thereof.

16. The process of claim 10, wherein the catalytic coating comprises a platinum group metal, a zirconia support, and up to 10% by weight lanthanum.

17. A process for oxidizing carbon monoxide in a carbon monoxide-containing gas stream comprising:
    receiving a carbon monoxide (CO)-containing gas stream comprising an amount of carbon monoxide into an inlet of a reaction chamber;
    exposing the CO-containing gas stream to a catalytic coating disposed on an internal surface of the reaction chamber;
    maintaining an oxygen concentration of at least 8 vol. % and a temperature of at least 600° C. within the reaction chamber;
    generating gaseous intermediate oxidizing species at the catalytic coating for oxidation of the carbon monoxide within the reaction chamber; and
    reacting at least a portion of the gaseous intermediate oxidizing species and carbon monoxide in a flow of the CO-containing gas stream as a homogeneous reaction to produce carbon dioxide within the reaction chamber.

18. The process of claim 17, wherein the CO-containing gas stream is from fuel combustion of a fuel source having an equivalence ratio of 0.8 or less, and wherein the process achieves a CO removal efficiency of at least 80%.

19. The process of claim 17, wherein the temperature within the reaction chamber is between 800° C. and 1000° C., wherein the oxygen concentration is from 8 to 18 vol. %, and further comprising introducing gaseous fuel additives into a flow of the CO-containing gas stream within the reaction chamber, wherein the gaseous fuel additives comprise one or more additives from the group consisting of hydrogen, methane, and homologues of methane.

20. The process of claim 17, wherein the catalytic coating comprises a platinum group metal, a zirconia support, and up to 10% by weight lanthanum.

* * * * *